United States Patent
Sarritzu

Patent Number: 5,407,655
Date of Patent: Apr. 18, 1995

[54] PROCESS FOR THE REMOVAL AND THE RECOVERY OF AMMONIA FROM LIQUID WASTE

[76] Inventor: Graziano Sarritzu, 7 Via Turbine, I-09045 Quartu Sant'Elena CA, Italy

[21] Appl. No.: 87,397

[22] Filed: Jul. 8, 1993

[30] Foreign Application Priority Data

Jul. 9, 1992 [IT] Italy .................. RM92A0521

[51] Int. Cl.$^6$ .............................. C01C 1/02
[52] U.S. Cl. .................... 423/357; 210/750; 423/420; 423/431
[58] Field of Search .......... 423/420, 431, 357; 210/750

[56] References Cited

U.S. PATENT DOCUMENTS

| 301,383 | 7/1884 | Mebus et al. | 423/431 |
|---|---|---|---|
| 1,838,587 | 12/1931 | Sperr | 423/357 |
| 2,981,596 | 4/1961 | McClure | 423/431 |
| 4,447,333 | 5/1984 | Wagener et al. | 210/750 |
| 4,689,156 | 8/1987 | Zibrida | 210/750 |
| 4,997,572 | 3/1991 | Wurtz | 210/750 |

FOREIGN PATENT DOCUMENTS 8878 of 1841 United Kingdom ............ 423/420

Primary Examiner—Wayne Langel
Attorney, Agent, or Firm—Browdy and Neimark

[57] ABSTRACT

A process for the removal and recovery of ammonia from liquid waste, characterized essentially by the following operations:
  reacting the liquid waste with pure carbon dioxide, or with a gaseous mixture rich in carbon dioxide, or with at least one carbonate, to give ammonium carbonate
  reacting the resulting ammonium carbonate with calcium chloride to give calcium carbonate and ammonium chloride;
  causing the resulting calcium carbonate to undergo thermal decomposition to give calcium oxide and carbon dioxide;
  using, optionally, the carbon dioxide formed after thermal decomposition of calcium carbonate for said reaction with the liquid waste; and
  using the calcium oxide, formed after thermal decomposition of calcium carbonate, for the production of pure ammonia, by reaction with the ammonium chloride obtained in said reaction between ammonium carbonate and calcium chloride.

The figure shows a flow sheet of a plant allowing the operations of an embodiment of the above process.

8 Claims, 1 Drawing Sheet

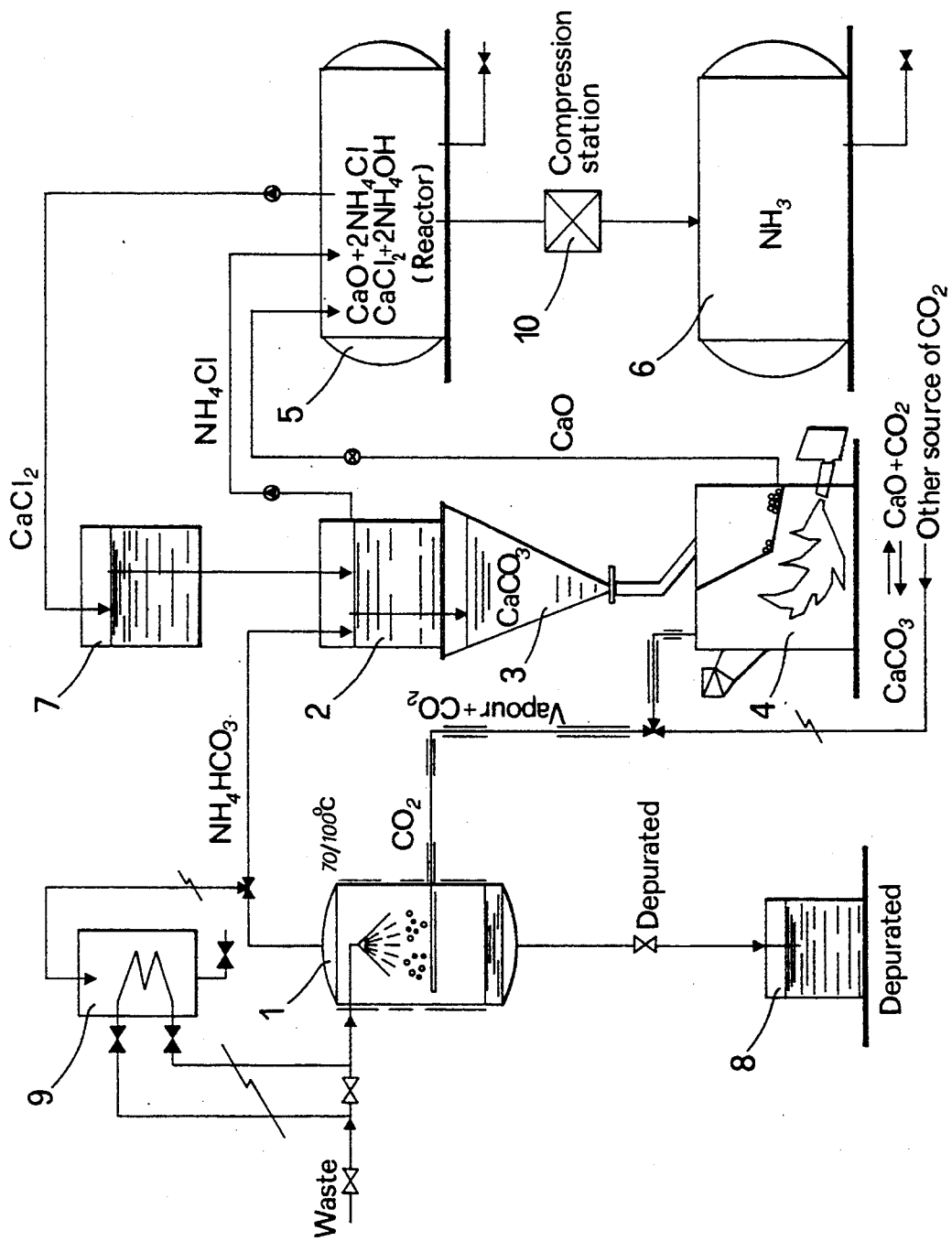

PROCESS FOR THE REMOVAL AND THE RECOVERY OF AMMONIA FROM LIQUID WASTE

The present invention has as its subject a process for the removal and recovery of ammonia from liquid waste, essentially based on the capacity of ammonia to form salts, preferably ammonium carbonate, said salts being capable of volatilizing from aqueous solutions at relatively low temperatures.

As is known, the problem of removing ammonia from liquid waste has already been faced in the past. In this regard, the state of the art shows a number of solutions: biological process using active sludge, stripping with chlorine and ozone, wet oxidation with oxygen, and stripping with air.

These methods, however, have been found to be not entirely satisfactory for technical, economical and environmental reasons. In their practical application, in fact, they come up against problems connected with the rigidity of the chemical and physical conditions required, with the low reaction yields, with the dangerous nature and high cost of the reagents or with the toxicity and environmentally harmful nature of the resulting products.

The method known commercially by the name of ASHAI has the advantage of allowing not only the removal of ammonia from liquid waste, but also its recovery. However, it has the serious disadvantage of requiring the use of a toxic/harmful compound and of requiring drastic operative conditions for its performance. (The waters containing ammonia are made to undergo extraction with air, which is then made to circulate in a closed circuit and is deprived of its ammonia by means of a solution of potassium bichromate at approximately 50%. The resulting solution is then distilled at a high temperature, approximately 150° C., and at high pressure, 7 kg/cm$^2$).

There is therefore, in this specific field, the need for a process for the removal and recovery of ammonia from liquid waste, which is more satisfactory from the point of view of operating conditions, working safety and respect for the environment.

The use of the present invention allows all the above objectives to be gained, while at the same time offering further advantages which will become clear from the following.

The process for the removal and recovery of ammonia from livid waste according to the present invention is characterized essentially by the following operations:

reacting the liquid waste with pure carbon dioxide, or alternatively with a gaseous mixture rich in carbon dioxide, or alternatively with at least one carbonate, to give ammonium carbonate;

reacting the resulting ammonium carbonate with calcium chloride to give calcium carbonate and ammonium chloride;

causing the resulting calcium carbonate to undergo thermal decomposition to give calcium oxide and carbon dioxide;

using, optionally, the carbon dioxide formed after thermal decomposition of calcium carbonate for said reaction with the liquid waste; and using the calcium oxide, formed after thermal decomposition of calcium carbonate, for the production of pure ammonia, by reaction with the ammonium chloride obtained in said reaction between ammonium carbonate and calcium chloride.

The pure carbon dioxide can be obtained from any source of carbon dioxide, for example from thermal decomposition of a carbonate, preferably calcium carbonate.

The gaseous mixture used as a starting reagent can be any gaseous mixture rich in carbon dioxide. It can be selected preferably from the group comprising. FLUE GAS, FUEL GAS, STEAM and combinations thereof. In these gaseous mixtures there is a concentration of carbon dioxide greater than 50% by volume.

Thermal decomposition of the calcium carbonate, obtained during the second stage of the process, is carried out preferably at a temperature not lower than 850° C.

It has already been seen that the process of the present invention is based on the ability of ammonia to form salts capable of volatilizing from aqueous solutions at relatively low temperatures, and that, among said salts, ammonium carbonate is the one which evaporates at the lowest temperature (approximately 60° C.), and is therefore the most convenient. To this advantage is added the possibility of inserting said reaction within a process for recovery of ammonia making use of reagents which are innocuous, versatile, easy to find, economical and which do not transfer problems connected with the strict need to protect the environment. Furthermore, the numerous manners of finding and productive use of streams rich in the main reagent (carbon dioxide) are met half way. These flows are present for the most part in the manufacturing areas in which the process subject of the present invention can be applied (FLUE GAS, FUEL GAS, STEAM or any other flow rich in carbon dioxide).

The process object of the present invention is thus aimed at all manufacturing activities which have to face the problem of ammonia. That is to say:

Agricultural complexes;
Livestock breeders and rearers;
Landfill lecheates from solid urban waste (RSU);
Petroleum and petrol-chemical industries;
Manufacturers of ammonia, of ammonium nitrate and sulphate, and of urea;
Waste from tar distillers;
Coke factories;
Food manufacturers and the like.

In conclusion, the process according to the present invention is proposed as a valid contribution for the enforcement of certain EEC Directives relating to the industrial discharge of dangerous substances, among which ammonia is numbered. In particular, as regards the situation in Italy, the process is proposed as a valid instrument for management at a company level of the recent legislative decree No. 133 (27 January 1992) concerning the enforcement of said directives.

Up to the present a description of a general nature has been given of the process forming the subject of the present invention. With the assistance of the single figure enclosed, a more detailed description of a specific embodiment of the process according to the invention will now be given, with the aim of clarifying the objects, features, advantages and method of application thereof.

BRIEF DESCRIPTION OF DRAWING

FIG. 1 shows the flow sheet of a plant allowing the operations of an embodiment of the process according to the present invention.

With reference to FIG. 1, 1 is the ammonia stripping reactor, 2 is the section in which the ammonium carbonlate is reacted with the calcium chloride, 3 is! the collection point for calcium carbonate, 4 is the oven for calcination of the calcium carbonate, 5 is the module in which ammonium is freed, 6 is the accumulation tank for the ammonia, 7 is the tank for the calcium chloride, 8 is the tank for the purified liquid waste, 9 is the condenser and 10 is the compression station.

The method of working of the plant is the following. A landfill lecheate from the discharge of solid urban waste which has been in function for approximately 8 years is sent to the stripping reactor 1, made up of a column packed with plastic material in which, at a temperature comprised between 70° and 100° C., it encounters a counter-current of carbon dioxide (FLUE GAS). The combination of the ammonia with the carbon dioxide takes place here, leading to the formation of ammonium carbonate, which can easily be extracted.

The stripping current arrives at the reaction section 2, where it is made to react with a solution of calcium chloride ($CaCl_2$). Calcium carbonate ($CaCO_3$) precipitates, collects on the bottom of the decanter 3 and is then sent to the calcination oven 4 for thermal decomposition at a temperature of approximately 1000° C.

Calcination of the calcium carbonate produces calcium oxide (CaO) and carbon dioxide ($CO_2$) which, in a current of vapor, and with integration if required, is sent to the stripping reactor 1, where it reacts with the ammonia in the liquid waste. The calcium oxide, on the other hand, is made to react, in module 5, with ammonium chloride ($NH_4Cl$), formed in the reaction section 2, to generate pure ammonia, which can be conserved in gas bottles 6, with recovery of calcium chloride which is recycled to combine with the ammonium carbonate from the stripping reactor 1.

I claim:

1. A process for the removal and recovery of ammonia from liquid waste, comprising
   (a) reacting the liquid waste with a gaseous mixture comprising at least one member selected from the group consisting of pure carbon dioxide, a gaseous mixture rich in carbon dioxide, and at least one carbonate, to give volatile ammonium carbonates which are stripped away by the gaseous mixture depleted of reacted $CO_2$;
   (b) reacting the resulting ammonium carbonates with calcium chloride to give calcium carbonate and ammonium chloride;
   (c) thermally decomposing the resulting calcium carbonate to give calcium oxide and carbon dioxide;
   (d) optionally further reacting the carbon dioxide formed after the thermal decomposition of calcium carbonate with the liquid waste according to step (a); and
   (e) reacting the ammonium chloride obtained in said reacting step (b) with the calcium oxide formed in step (c) to form recoverable amounts of ammonia.

2. The process according to claim 1, wherein said reacting step (a) is carried out at a temperature between about 50° and 120° C.

3. The process according to claim 1, wherein the pure carbon dioxide is obtained from thermal decomposition of a carbonate.

4. The process according to claim 3, wherein the carbon dioxide is obtained from thermal decomposition of calcium carbonate.

5. The process according to claim 1, wherein the gaseous mixture rich in carbon dioxide is selected from at least one of the group consisting of FLUE GAS, FUEL GAS, and STEAM.

6. The process according to claim 5, wherein the gaseous mixture rich in carbon dioxide has a concentration of carbon dioxide greater than 50% by volume.

7. The process according to claim 1, wherein the thermal decomposition of the calcium carbonate in step (c) is performed at a temperature of at least 850° C.

8. The process according to claim 1, wherein the ammonia is recovered in the form of ammonium carbonate after treatment of the liquid waste with at least one carbonate.

* * * * *